United States Patent
Pais et al.

(10) Patent No.: US 8,599,859 B2
(45) Date of Patent: Dec. 3, 2013

(54) ITERATIVE PARSING AND CLASSIFICATION

(75) Inventors: Alon Pais, D.N. Shimshon (IL); Nafea Bishara, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 314 days.

(21) Appl. No.: 12/947,678

(22) Filed: Nov. 16, 2010

(65) Prior Publication Data

US 2011/0116507 A1    May 19, 2011

Related U.S. Application Data

(60) Provisional application No. 61/261,472, filed on Nov. 16, 2009.

(51) Int. Cl.
*G06F 9/26* (2006.01)

(52) U.S. Cl.
USPC ..................... 370/395.32; 711/220

(58) Field of Classification Search
USPC ................ 370/374, 392, 395.7, 395.32, 409; 711/108, 128, 154, 217, 220
See application file for complete search history.

(56) References Cited

U.S. PATENT DOCUMENTS

| | | | | |
|---|---|---|---|---|
| 5,414,650 A * | 5/1995 | Hekhuis | ..................... | 708/203 |
| 5,473,607 A * | 12/1995 | Hausman et al. | ............. | 370/392 |
| 5,608,662 A * | 3/1997 | Large et al. | ................... | 708/300 |
| 5,805,808 A * | 9/1998 | Hasani et al. | ................ | 709/243 |
| 5,812,760 A * | 9/1998 | Mendenhall et al. | ........... | 714/49 |
| 5,916,305 A * | 6/1999 | Sikdar et al. | .................. | 709/236 |
| 5,938,736 A * | 8/1999 | Muller et al. | ................. | 709/243 |
| 6,097,724 A * | 8/2000 | Kartalopoulos | ........... | 370/395.3 |
| 6,246,601 B1 * | 6/2001 | Pereira | ........................ | 365/49.17 |
| 6,356,951 B1 * | 3/2002 | Gentry, Jr. | ..................... | 709/250 |
| 6,480,489 B1 * | 11/2002 | Muller et al. | ................. | 370/389 |
| 6,553,453 B1 * | 4/2003 | Gibson et al. | ................. | 711/108 |
| 6,606,681 B1 * | 8/2003 | Uzun | ............................. | 711/108 |
| 6,609,222 B1 * | 8/2003 | Gupta et al. | .................. | 714/733 |
| 6,715,029 B1 * | 3/2004 | Trainin et al. | ................. | 711/108 |
| 6,826,180 B1 * | 11/2004 | Bergantino et al. | ........... | 370/389 |
| 6,862,281 B1 * | 3/2005 | Chandrasekaran | .......... | 370/392 |
| 6,871,262 B1 * | 3/2005 | Oren et al. | ..................... | 711/108 |
| 6,879,596 B1 * | 4/2005 | Dooply | ........................ | 370/412 |
| 6,970,462 B1 * | 11/2005 | McRae | ........................ | 370/392 |
| 7,002,965 B1 * | 2/2006 | Cheriton | ................. | 370/395.32 |

(Continued)

OTHER PUBLICATIONS

Taylor D et al: "System-on-chip packet processor for an experimental network services platform", Globecom 2003. IEEE Global Telecommunications Conference. Conference Proceedings. San Francisco, CA, Dec. 1-5, 2003 [IEEE Global Telecommunicatiosn Conference], New York, NY: IEEE, US, vol. 7, Dec. 1, 2003, pp. 3933-3937.

*Primary Examiner* — Michael Thier
*Assistant Examiner* — Prince A Mensah (57) ABSTRACT

Some of the embodiments of the present disclosure provide a method comprising performing, by an iterative parser and classifier engine, a first parsing and classification cycle on a data packet, based at least in part on header information of the data packet; generating a first parsing and classification result based at least in part on performing the first parsing and classification cycle; and performing a second parsing and classification cycle on the data packet, based at least in part on header information of the data packet and the first parsing and classification result. Other embodiments are also described and claimed.

16 Claims, 6 Drawing Sheets

(56) References Cited

U.S. PATENT DOCUMENTS

| | | | |
|---|---|---|---|
| 7,187,694 B1 * | 3/2007 | Liao | 370/474 |
| 7,197,597 B1 * | 3/2007 | Scheid et al. | 711/106 |
| 7,240,149 B1 * | 7/2007 | Nagaraj et al. | 711/108 |
| 7,304,996 B1 * | 12/2007 | Swenson et al. | 370/394 |
| 7,325,074 B2 * | 1/2008 | McRae | 709/242 |
| 7,386,525 B2 * | 6/2008 | Nurmela et al. | 706/47 |
| 7,412,507 B2 * | 8/2008 | Saxena et al. | 709/224 |
| 7,415,012 B1 * | 8/2008 | Mankins | 370/389 |
| 7,646,771 B2 * | 1/2010 | Guru et al. | 370/392 |
| 7,689,485 B2 * | 3/2010 | Kanekar et al. | 705/35 |
| RE41,659 E * | 9/2010 | Gupta et al. | 714/733 |
| 7,941,605 B1 * | 5/2011 | Oren et al. | 711/128 |
| 7,941,606 B1 * | 5/2011 | Pullela et al. | 711/128 |
| 2001/0007559 A1 * | 7/2001 | Le Pennec et al. | 370/392 |
| 2003/0053460 A1 * | 3/2003 | Suda et al. | 370/392 |
| 2003/0108038 A1 * | 6/2003 | Devanagondi et al. | 370/389 |
| 2003/0212900 A1 * | 11/2003 | Liu et al. | 713/200 |
| 2004/0103291 A1 * | 5/2004 | Craft | 713/193 |
| 2004/0228339 A1 * | 11/2004 | Gallo et al. | 370/379 |
| 2005/0132008 A1 * | 6/2005 | Brown et al. | 709/206 |
| 2006/0182143 A1 * | 8/2006 | Lu | 370/469 |
| 2007/0211725 A1 * | 9/2007 | Kawata et al. | 370/392 |
| 2008/0091785 A1 * | 4/2008 | Pulfer et al. | 709/206 |
| 2008/0165778 A1 * | 7/2008 | Ertemalp | 370/392 |
| 2008/0232374 A1 * | 9/2008 | Kopelman et al. | 370/392 |
| 2010/0232434 A1 * | 9/2010 | Xu et al. | 370/392 |
| 2010/0254391 A1 * | 10/2010 | Kramer et al. | 370/395.32 |

* cited by examiner

ITERATIVE PARSING AND CLASSIFICATION

CROSS REFERENCE TO RELATED APPLICATIONS

The present application claims priority to U.S. Pat. Application No. 61/261,472, filed Nov. 16, 2009, the entire specification of which is hereby incorporated by reference in its entirety for all purposes, except for those sections, if any, that are inconsistent with this specification.

TECHNICAL FIELD

Embodiments of the present disclosure relate to parsing and classification in general, and more specifically, to iterative parsing and classification of data packets.

BACKGROUND

Unless otherwise indicated herein, the approaches described in this section are not prior art to the claims in the present disclosure and are not admitted to be prior art by inclusion in this section.

A packet communication network typically includes a number of network devices, such as switches, routers, traffic controllers and traffic shapers that transmit, reroute or manage flow of data packets across the network. Each data packet, in addition to data, also includes a number of control fields disposed in the data packet's header. Such fields include, for example, a source address and a destination address of the data packet, type of the data packet, a protocol associated with the data packet, and/or the like. A data packet is often parsed by a parser in accordance with a set of predefined network protocols and rules that, in aggregate, define the encapsulation structure of the data packet. For example, when parsing an Internet Protocol (IP) data packet, a parser examines an IP version number (e.g., version 4 or 6) of the data packet. A classifier classifies a data packet based at least in part on the parsing results.

SUMMARY

In various embodiments, the present disclosure provides a method comprising performing, by an iterative parser and classifier engine, a first parsing and classification cycle on a data packet, based at least in part on header information of the data packet; generating a first parsing and classification result based at least in part on performing the first parsing and classification cycle; and performing a second parsing and classification cycle on the data packet, based at least in part on header information of the data packet and the first parsing and classification result.

There is also provided a system-on-chip (SOC) comprising a processing core; and an iterative parser and classifier engine (IPAC) comprising a packet header offset unit configured to receive a data packet and to generate, during a first iterative cycle, a first header portion from a header of the data packet, a ternary content-addressable memory (TCAM), wherein the IPAC is configured to perform, during the first iterative cycle, a first look-up at the TCAM using the first header portion, and to generate a first memory address in response to the first look-up, and a memory, wherein the IPAC is configured to access, during the first iterative cycle, a first content from the first memory address in the memory.

There is also provided a method comprising receiving a data packet; performing, using a first header portion of a header of the data packet, a first look-up at a ternary content-addressable memory (TCAM) to generate a first content based on an output of the TCAM; and performing, using a second header portion of the header of the data packet and the first content, a second look-up at the TCAM to generate a second address.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents FIG. 1 schematically illustrates a packet communication system that includes a system-on-chip comprising an iterative parser and classifier engine, in accordance with an embodiment of the present disclosure.

DETAILED DESCRIPTION

A content-addressable memory (CAM), which is also known as associative memory or associative storage, is generally used for high-speed searches. A CAM is generally designed such that a user supplies a data word to the CAM, and the CAM searches its entire memory to see if that data word is stored anywhere in the CAM. If the data word is found in the CAM (i.e., if the data word is a hit), the CAM returns information associated with the data word (e.g., returns an address associated with the data word, and/or any other appropriate information). In an example, an address returned by the CAM is an address of a memory (e.g., a random access memory). Binary CAM employs search terms composed entirely of 1's and 0's. Ternary CAM (TCAM) employs search terms comprising 1's, 0's, and a third state of "X" or "Don't-Care" bits. The "X" or "Don't-Care" bits are bits whose values are of no relevance to the search being conducted.

Figure 1:
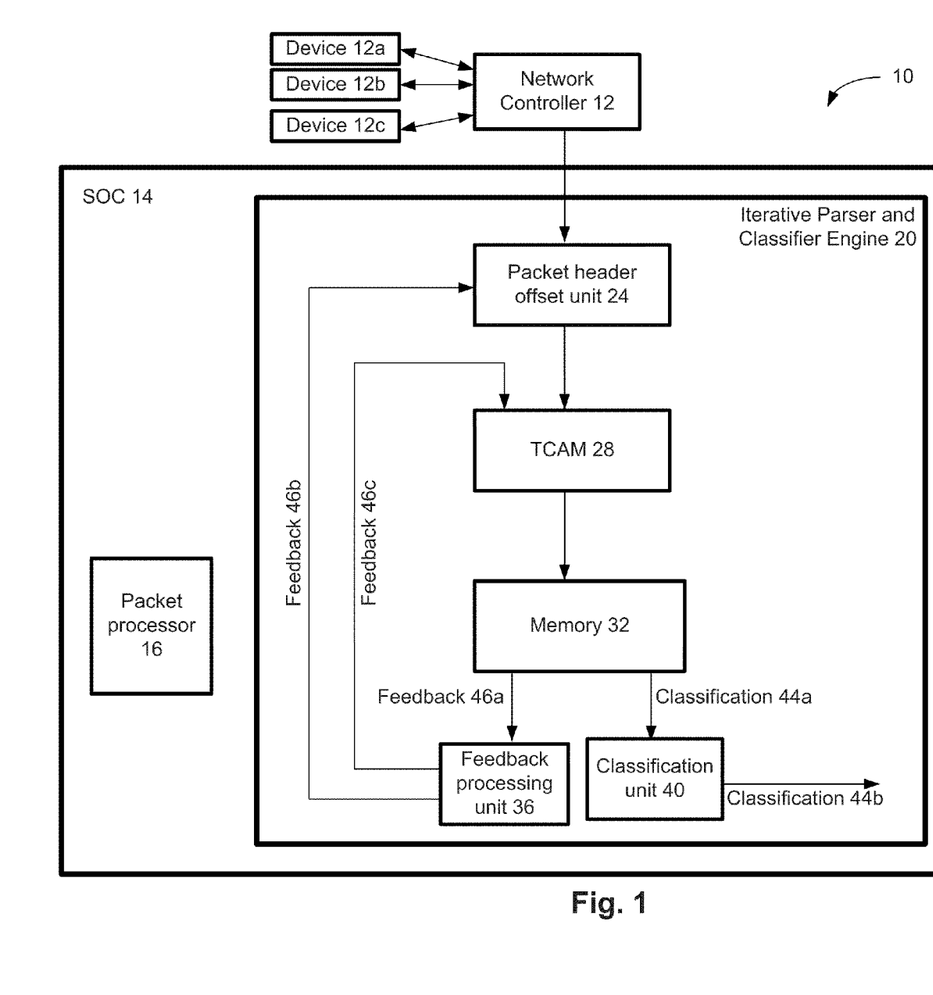

FIG. 1 schematically illustrates a packet communication system 10 that includes a system-on-chip (SOC) 14 comprising an iterative parser and classifier engine 20 (also referred to hereinafter as IPAC 20), in accordance with an embodiment of the present disclosure. The SOC 14 also includes one or more processing cores, and a packet processor 16. In an embodiment, the packet processor 16 is part of a switch, such as an Ethernet switch, a home gateway or any other packet processing device. However the current disclosure is not limited to such implementations. Although the SOC 14 includes several other components (e.g., a communication bus, one or more peripherals, interfaces, and/or the like), these components are not illustrated in FIG. 1 for the purpose of illustrative clarity.

The IPAC 20 receives data packets from a network controller 12, and parses and/or classifies the received data packets. Although the network controller 12 is illustrated in FIG. 1 to be external to the SOC 14, in an embodiment, the network controller 12 is included in the SOC 14. Although FIG. 1 illustrates only one network controller 12, in an embodiment, the IPAC 20 receives data packets from more than one network controller. Although not illustrated in FIG. 1, in an embodiment, the IPAC 20 receives data packets from other devices as well, e.g., a network switch, a network router, a network port, an Ethernet port, the packet processor 16, and/or the like, and parses and/or classifies the received data packets.

In an embodiment, the IPAC 20 is implemented in a packet processor, for example in a network switch, a network router, a home gateway, in the packet processor 16, any appropriate device that has network connectivity, and/or the like. The network controller 12 transceives (e.g., transmits and/or receives) data packets to and/or from a plurality of devices, e.g., device 12a, device 12b, and/or device 12c. In an embodiment, devices 12a, 12b, and/or 12c are also network devices, e.g., a network switch, a network router, a network port, an Ethernet port, any appropriate device that has network connectivity, and/or the like.

In an embodiment, the IPAC 20 includes a packet header offset unit 24 configured to receive data packets from the network controller 12. As will be discussed in more detail herein later, the IPAC 20 performs a plurality of iterative parsing and classification cycles to parse and/or classify a data packet. The packet header offset unit 24 receives a parsing and classification result from a previous parsing and classification cycle (expect during a first parsing and classification cycle), and outputs header information from the header of the data packet during a current parsing and classification cycle based in part on the parsing and classification result received form the previous parsing and classification cycle. For example, in different parsing and classification cycles, the packet header offset unit 24 can offset the header of the data packet in different manners, thereby outputting different areas of the header.

The IPAC 20 also includes a TCAM 28. During each parsing and classification cycle, the TCAM 28 receives input from the packet header offset unit 24 and feedback 46c, performs a search in the TCAM 28 database based on the receive input, and outputs a memory address. The IPAC 20 further includes a memory 32 configured to receive output (e.g., the memory address) from the TCAM 28, and to output feedback information 46a and classification information 44a (also referred to hereinafter as feedback 46a and classification 44a, respectively). In an embodiment, the memory 32 is any appropriate type of memory, e.g., an appropriate type of random access memory (RAM), e.g., a static RAM (SRAM).

The feedback 46a is received by a feedback processing unit 36, which is configured to output feedback information 46b and feedback information 46c (also referred to hereinafter as feedback 46b and feedback 46c, respectively) based at least in part on the feedback 46a. In an embodiment and as will be explained in more detail herein later, feedback 46a is associated with parsing and classification results of one or more parsing and classification cycles. The feedback processing unit 36 processes the feedback 46a to generate feedback 46b and 46c.

During a first parsing and classification cycle, the packet header offset unit 24 is configured to selectively output, for a data packet received from the network controller 12, one or more bytes from a header of the data packet. During one or more subsequent parsing and classification cycles, the packet header offset unit 24 is configured to selectively output, for the data packet received from the network controller 12, one or more bytes from the header of the data packet, based at least in part on the feedback 46b. The TCAM 28 is configured to receive output of the packet header offset unit 24 and the feedback 46c (e.g., receive the feedback 46c during the one or more subsequent parsing and classification cycles), and configured to generate a corresponding output.

The classification 44a is received by a classification unit 40, which is configured to generate classification information 44b (also referred to as classification 44b) based at least in part on the classification 44a. In an embodiment, the classification 44a includes information associated with classification of a data packet received by the IPAC 20, and the classification unit 40 processes the classification 44a to generate classification 44b. In an embodiment, the classification 44b classifies the data packet received by the IPAC 20. For example, the classification 44b includes information associated with a type, a priority, a destination address, a queue address, and/or the like, of the received data packet.

The IPAC 20 is configured to iteratively parse and classify data packets that the IPAC 20 receives from the network controller 12. In an example, the IPAC 20 performs a first parsing and classification cycle on a data packet received from the network controller 12, based at least in part on header information of the data packet. The IPAC 20 then generates a first parsing and classification result (e.g., which includes feedback 46a and classification 44a) based at least in part on performing the first parsing and classification cycle. The IPAC 20 subsequently performs a second parsing and classification cycle on the data packet, based at least in part on header information of the data packet and the first parsing and classification result (e.g., based at least in part on the feedback 46b and 46c generated from the feedback 46a). The IPAC 20 continues these operations until the data packet is fully parsed and/or classified (e.g., until a complete parsing and classification result of the data packet is generated).

In another example, the IPAC 20 receives a data packet from the network controller 12. The IPAC 20 performs, using a first header portion of a header of the data packet, a first look-up at the TCAM 28 to generate a first address. The IPAC 20 accesses a first content from the first address of the memory 32. Subsequently, the IPAC 20 performs, using a second header portion of the header of the data packet and the first content, a second look-up at the TCAM 28 to generate a second address. The IPAC 20 continues these operations until the data packet is fully parsed and/or classified.

Figure 2:
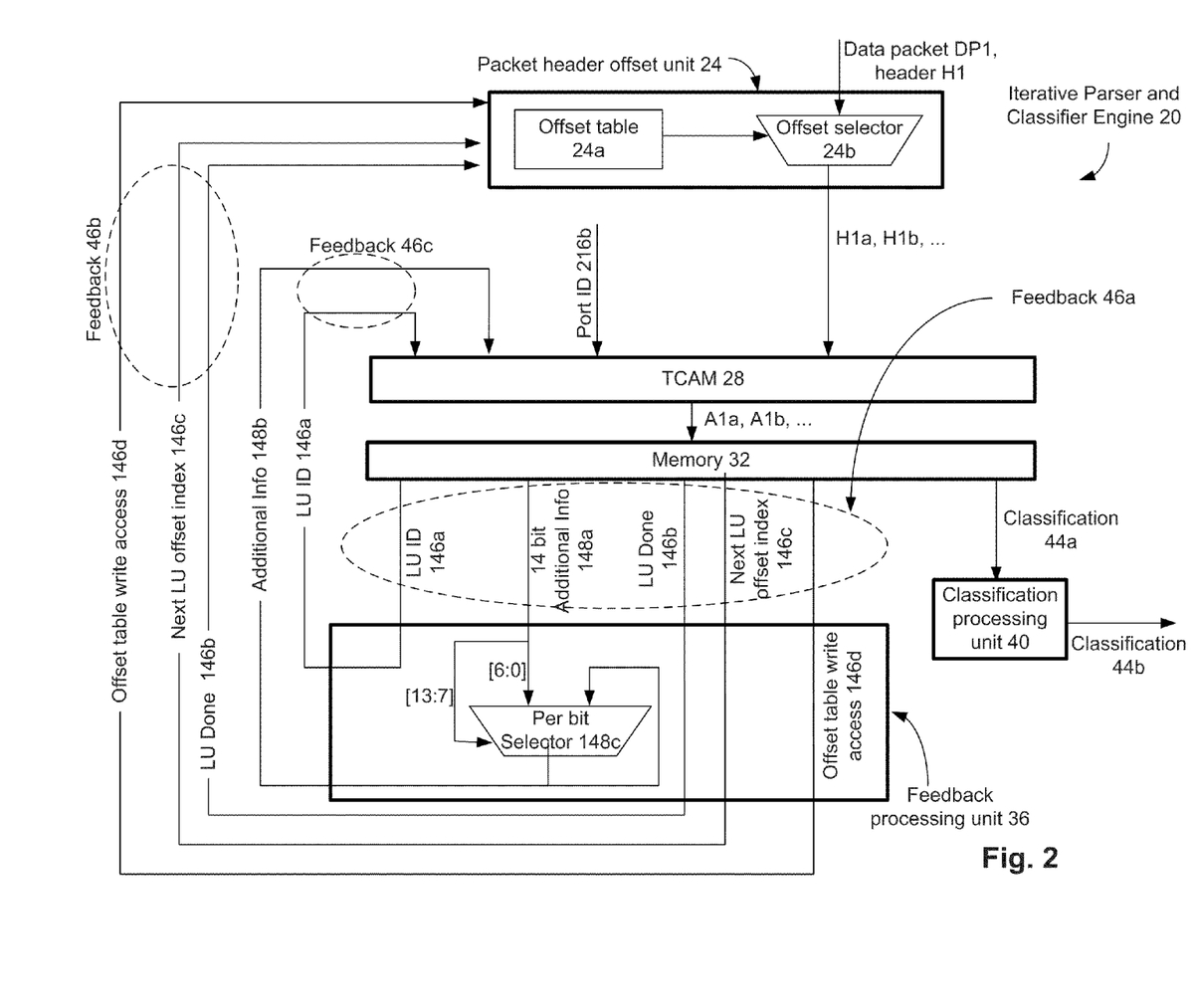
FIGS. 2 and 3 schematically illustrate the iterative parser and classifier engine of FIG. 1 in more detail, in accordance with an embodiment of the present disclosure.

FIG. 2 schematically illustrates the IPAC 20 of FIG. 1 in greater detail, in accordance with an embodiment of the present disclosure. More specifically, FIG. 2 illustrates the feedback processing unit 36, the packet header offset unit 24, feedback 46a, feedback 46b, and feedback 46c in more detail.

Referring to FIGS. 1 and 2, in an embodiment, the feedback 46b comprises look-up (LU) done signal 146b (also referred to herein as LU done 146b), next LU offset index 146c, and offset table write access 146d. The feedback 46c comprises additional information 148b (also referred to herein as additional info 148b) and LU identification 146a (also referred to herein as LU ID 146a), as will be discussed in more detail herein later.

Referring again to FIGS. 1 and 2, the packet header offset unit 24 includes an offset table 24a and an offset selector 24b. The offset selector 24b comprises a multiplexer, as illustrated in FIG. 2. In an embodiment, the packet header offset unit 24 (e.g., the offset selector 24b) receives a series of data packets, including a data packet DP1, from the network controller 12. The data packet DP1 includes a header H1. In another embodiment, instead of receiving the entire data packet DP1, the packet header offset unit 24 receives only the header H1 of the data packet DP1.

The parsing and classification of data packet DP1 is performed in an iterative manner by the IPAC 20. For example, the parsing and classification of the data packet DP1 is performed using a first parsing and classification cycle, a second parsing and classification cycle, and so on, until the data packet DP1 is fully parsed and classified.

During the first parsing and classification cycle, the offset selector 24b outputs one or more number of bytes (labeled as header portion H1a) from the header H1 of the data packet DP1. In an example, the offset selector 24b receives first 120 bytes of the header H1 of the data packet DP1, and selects and outputs the first 24 bytes of the header H1 as the header portion H1a. The "1" in the header portion H1a indicates that the header portion H1a is associated with the data packet DP1, and the "a" in the header portion H1a indicates that the header portion H1a is output during the first parsing and classification cycle.

In an embodiment, during the first parsing and classification cycle, the header portion H1a output by the offset selector 24b is independent of an output of the offset table 24a (e.g., independent of the feedback 46b). Also, during the first parsing and classification cycle, one or more bits of the feedback 46b do not include any meaningful information (as during the first parsing and classification cycle, the one or more bits of the feedback 46b are not generated from any previous parsing and classification cycle of the data packet DP1). However, during subsequent parsing and classification cycles, the output of the offset selector 24b is based at least in part on the output of the offset table 24a, which is based on feedback 46b from the immediate previous parsing and classification cycle. For example, during the second parsing and classification cycle, a header portion H1b, output by the offset selector 24b, is based at least in part on the feedback 46b from the first parsing and classification cycle.

In and embodiment, during the first parsing and classification cycle, the TCAM 28 receives the header portion H1a, i.e., the output of the offset selector 24b. Although not illustrated in FIG. 1 (but illustrated in FIG. 2), the TCAM 28 also receives a port ID information 216b (also referred to herein as port ID 216b) from, for example, any appropriate component of the system 10 (e.g., from the network controller 12). The port ID 216b includes an identification of a port associated with the data packet DP1 (e.g., an identification of a port from which the data packet DP1 originates, an identification of a port from which the data packet DP1 is received, and/or the like).

As previously discussed, the TCAM 28 also receives feedback 46c (i.e., additional info 148b and LU ID 146a). However, during the first parsing and classification cycle, one or more bits of the feedback 46c do not include any meaningful information (as during the first parsing and classification cycle, the one or more bits of the feedback 46c are not generated from any previous parsing and classification cycle of the data packet DP1). Thus, during the first parsing and classification cycle, these bits of the feedback 46c are treated as Don't-care bits (e.g., bits X) by the TCAM 28 (e.g., the TCAM 28 receives and/or generates an indication that the current cycle is the first parsing and classification cycle, based on which the TCAM 28 treats the bits of the feedback 46c as Don't care bits).

During the first parsing and classification cycle, based at least in part on the header portion H1a and the port ID 216b (along with bits of feedback 46c, including Don't-care bits of the feedback 46c), the TCAM 28 performs a look-up at the contents of the TCAM 28. For example, the TCAM 28 compares the received data with data stored in the TCAM 28. In case a match is found (i.e., if the first parsing and classification cycle is a TCAM hit), corresponding information is output by the TCAM 28 to the memory 32. In an embodiment, based on a TCAM hit during the first parsing and classification cycle, the TCAM 28 outputs a corresponding address A1a. The "1" in the address A1a indicates that the address A1a is associated with the data packet DP1, and the "a" in the address A1a indicates that the address Ala is associated with the first parsing and classification cycle.

In an embodiment, the address A1a is an address of the memory 32. Subsequent to the look-up of the TCAM 28, during the first parsing and classification cycle, the memory 32 outputs data stored in the address A1a. For example, the memory 32 outputs feedback 46a and classification 44a. In an embodiment, feedback 46a comprises LU ID 146a, LU done 146b, next LU offset index 146c, offset table write access 146d, and/or additional information 148a (also referred to herein as additional info 148a), as illustrated in FIG. 2.

FIG. 2 illustrates the feedback processing unit 36 receiving and re-transmitting the LU done 146b, the next LU offset index 146c, offset table write access 146d, and the LU ID 146a. For example, in an embodiment, the LU done 146b, the next LU offset index 146c, offset table write access 146d, and the LU ID 146a are received by the feedback processing unit 36, and transmitted to their respective destinations without any further processing of these signals. However, in an embodiment, the LU done 146b, the offset table write access 146d, and the next LU offset index 146c are transmitted from the memory 32 to the packet header offset unit 24, by bypassing the feedback processing unit 36. Similarly, in an embodiment, the LU ID 146a is transmitted from the memory 32 to the TCAM 28, by bypassing the feedback processing unit 36.

The feedback processing unit 36 receives and processes the additional info 148a. In an example, the additional info 148a is a 14 bit signal, and the feedback processing unit 36 includes a multiplexer (illustrated as per bit selector 148c) that outputs one or more bits of the additional info 148a as additional info 148b. The multiplexing operation performed by the feedback processing unit 36 is based, for example, on one or more bits of the additional info 148a and/or one or more bits of the additional info 148b. The feedback processing unit 36, as illustrated in FIG. 2, is purely an example, and is configurable based at least in part on, for example, an application area of the IPAC 20, nature of data packets received by the IPAC 20, and/or the like.

During the first parsing and classification cycle, the memory 32 also outputs classification 44a. As previously discussed, the IPAC 20 undergoes one or more parsing and classification cycles for parsing and classifying the data packet DP1. In an embodiment, the classification 44a is used by the classification processing unit 40, to output classification 44b, only during the last parsing and classification cycle for the data packet DP1. For example, although not illustrated in FIG. 2, the classification processing unit 40 receives an indication (e.g., from the feedback 46a, classification 44a, and/or by any other appropriate manner) that the current parsing and classification cycle is the last parsing and classification cycle for the data packet, based on which the classification processing unit 40 outputs classification 44b during the current parsing and classification cycle. For example, if three parsing and classification cycles are used for data packet DP1, the classification 44a, which is output by the memory 32 during the third parsing and classification cycle, is used by the classification processing unit 40 to output classification 44b. In another embodiment, the classification 44b is updated after each parsing and classification cycle. In yet another embodiment, some of the signals associated with the classification 44b are updated after each parsing and classification cycle, while remaining signals associated with the classification 44b are updated only during the last parsing and classification cycle for the data packet DP1.

In an embodiment, the LU done 146b (generation of which is discussed in more detail herein later), which can be a single bit signal, indicates whether a further parsing and classification cycle is necessary for parsing and/or classifying the data packet DP1. Thus, the LU done 146b acts as a parsing and classification complete flag. A low value of the LU done 146b indicates, for example, that the parsing operation is incomplete and a further parsing and classification cycle is required. A high value of the LU done 146b indicates that the parsing operation is complete. For example, if, at the end of the first parsing and classification cycle, the LU done 146b is low (i.e., if the LU done 146b indicates that the parsing and/or classification operation of the data packet DP1 is incomplete), the IPAC 20 starts the second parsing and classification cycle for the data packet DP1. Similarly, if, at the end of the second parsing and classification cycle, the LU done 146b is high (i.e., if the LU done 146b indicates that the parsing and/or classification operation of the data packet DP1 is complete), the IPAC 20 does not perform any further parsing and classification cycle for the data packet DP1.

In an embodiment, the next LU offset index 146c and the offset table write access 146 of a current parsing and classification cycle are associated with an offset of the header of the data packet DP1, to be selected by the packet header offset unit 24 during a next parsing and classification cycle. For example, as previously discussed, during the first parsing and classification cycle, the header portion H1a comprises first 24 bytes of the header H1 of the data packet DP1. Also, during the second parsing and classification cycle, the packet header offset unit 24 selects and outputs header portion H1b from the header H1 of the data packet DP1. However, unlike header portion H1a which included the first 24 bytes of the header H1, the header portion H1b, for example, can comprise any other bytes of the header H1, based at least in part on the next LU offset index 146c and the offset table write access 146 of the first parsing and classification cycle. The header portion H1b, for example, in an embodiment, comprises 14 bytes, starting from byte number 12 of the header H1, based at least in part on the next LU offset index 146c and the offset table write access 146 of the first parsing and classification cycle.

In an embodiment, the LU ID 146a of a parsing and classification cycle is associated with a look-up identification of a next parsing and classification cycle. For example, LU ID 146a of the first parsing and classification cycle is associated with look-up identification of the second parsing and classification cycle. The look-up identification of the second parsing and classification cycle identifies, for example, a logical area of the TCAM 28 that is to be searched (or looked-up) during the second parsing and classification cycle. As an example, if the second parsing and classification cycle is associated with matching a priority of the data packet DP1 with entries of the TCAM 28, then the LU ID 146a of the first parsing and classification cycle includes data bytes associated with priority of the data packet DP1.

The additional info 148b output during a current parsing and classification cycle is associated with additional information to be used in the TCAM look-up during a next parsing and classification cycle. For example, the additional info 148b output during the first parsing and classification cycle is associated with additional information to be used in the TCAM look-up during the second parsing and classification cycle. In an embodiment, the additional info 148b includes any relevant information that can be passed from one parsing and classification cycle to the next parsing and classification cycle. For example, the additional info 148b includes any knowledge learned during the current parsing and classification cycle, which is relevant during the next parsing and classification cycle. The additional info 148b field is, for example, based on the type and structure of the data packet DP1, an application area of the IPAC 20, and/or the like.

Figure 3:
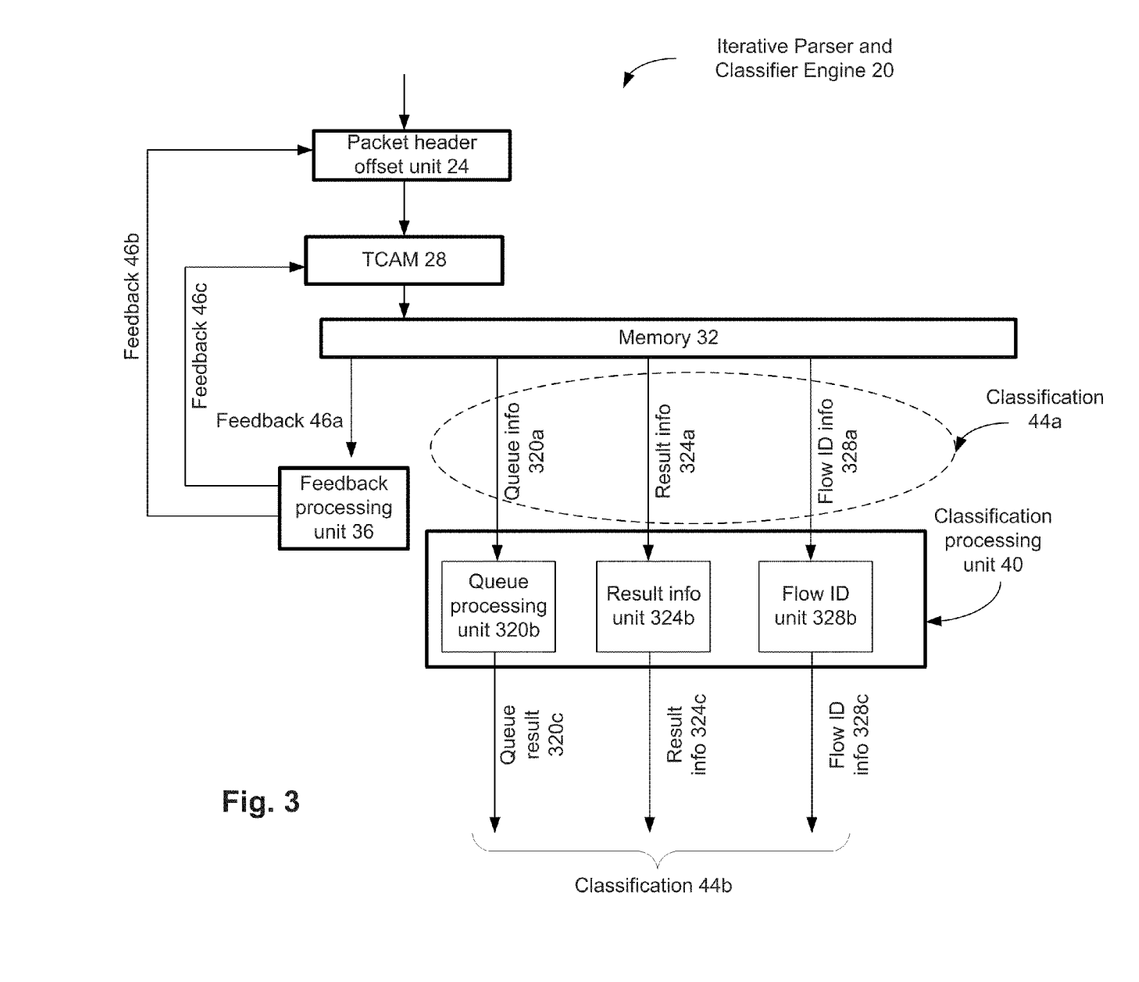

FIG. 3 schematically illustrates the IPAC 20 of FIG. 1 in more detail, in accordance with an embodiment of the present disclosure. More specifically, FIG. 3 illustrates the classification processing unit 40, classification 44a, and classification 44b in more detail.

As previously discussed, in an embodiment, the classification 44a is used by the classification processing unit 40, to output classification 44b, only during the last parsing and classification cycle for the data packet DP1. For example, if three parsing and classification cycles are used for data packet DP1, the classification 44a, which is output by the memory 32 during the third parsing and classification cycle, is used by the classification processing unit 40 to output classification 44b. In another embodiment, the classification 44b is updated after each parsing and classification cycle. In yet another embodiment, some of the signals associated with the classification 44b are updated after each parsing and classification cycle, while remaining signals associated with the classification 44b are updated only during the last parsing and classification cycle for the data packet DP1.

In an embodiment, the classification 44a includes queue information 320a (also referred to herein as queue info 320a), result information 324a (also referred to herein as result info 324a), and/or flow identification information 328a (also referred to herein as flow ID info 328a).

The classification processing unit 40 includes a queue processing unit 320b, a result info unit 324b, and a flow ID unit 328b, configured to process queue info 320a, result info 324a, and flow ID info 328a, respectively, and further configured to output queue result 320c, result info 324c, and flow ID info 328c, respectively.

As previously discussed, the classification 44b classifies the data packet DP1 received by the IPAC 20. For example, the queue results 320c includes queue information (e.g., a queue to which the data packet DP1 originally belonged, a destination queue of the data packet DP1, a priority of the data packet DP1, and/or the like) associated with the data packet DP1. The result info 324c includes, for example, a type of the data packet DP1 (e.g., a protocol (like IP version 4 (IPv4), IPv6, etc.) associated with the data packet DP1, a command (e.g., a modification command to modify the data packet DP1) associated with the data packet DP1, and/or any other relevant information associated with the data packet DP1. The flow ID info 328c includes, for example, information associated with a flow of the data packet DP1. For example, the flow ID info 328c includes a flow identification number, routing information, pointer information, flow cookie information, and/or the like, associated with the data packet DP1.

The queue result 320c, result info 324c, and flow ID info 328c of the classification 44b are only examples, and in other embodiments, the classification 44b can include any other relevant classification information of the data packet DP1.

Figure 4A:
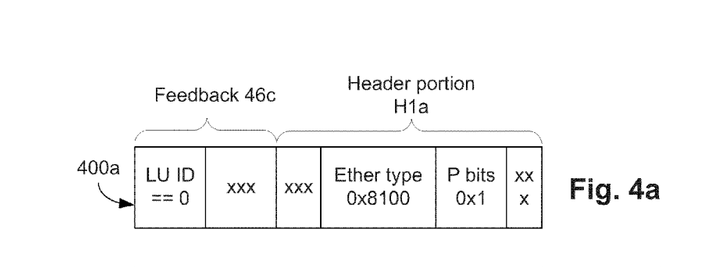
FIG. 4a schematically illustrates an example input to a ternary content-addressable memory of the iterative parser and classifier engine of FIGS. 1-3, during a first parsing and classification cycle, in accordance with an embodiment of the present disclosure.

FIG. 4a schematically illustrates an example input 400a to the TCAM 28 during the first parsing and classification cycle, in accordance with an embodiment of the present disclosure. The header portion H1a of FIGS. 1-3 forms a part of the input 400a, while the feedback 46c of FIGS. 1-3 forms another part of the input 400a. The fields and associated values in the input 400a are purely an example, and are in no way limiting on the teachings of the present disclosure.

As previously discussed, the feedback 46c includes LU ID 146a. During the first parsing and classification cycle, the LU ID 146a is zero by default, as illustrated in FIG. 4a. Furthermore, feedback 46c also includes additional bytes (e.g., additional info 148b), which are set to Don't-care condition x in the example input 400a of FIG. 4a. The header portion H1a in the example of FIG. 4a includes an Ethernet type of the data packet DP1 (which is equal to 0×8100), priority bits (which is equal to 0×1), and several other fields including additional Don't-care bits.

Figure 4B:
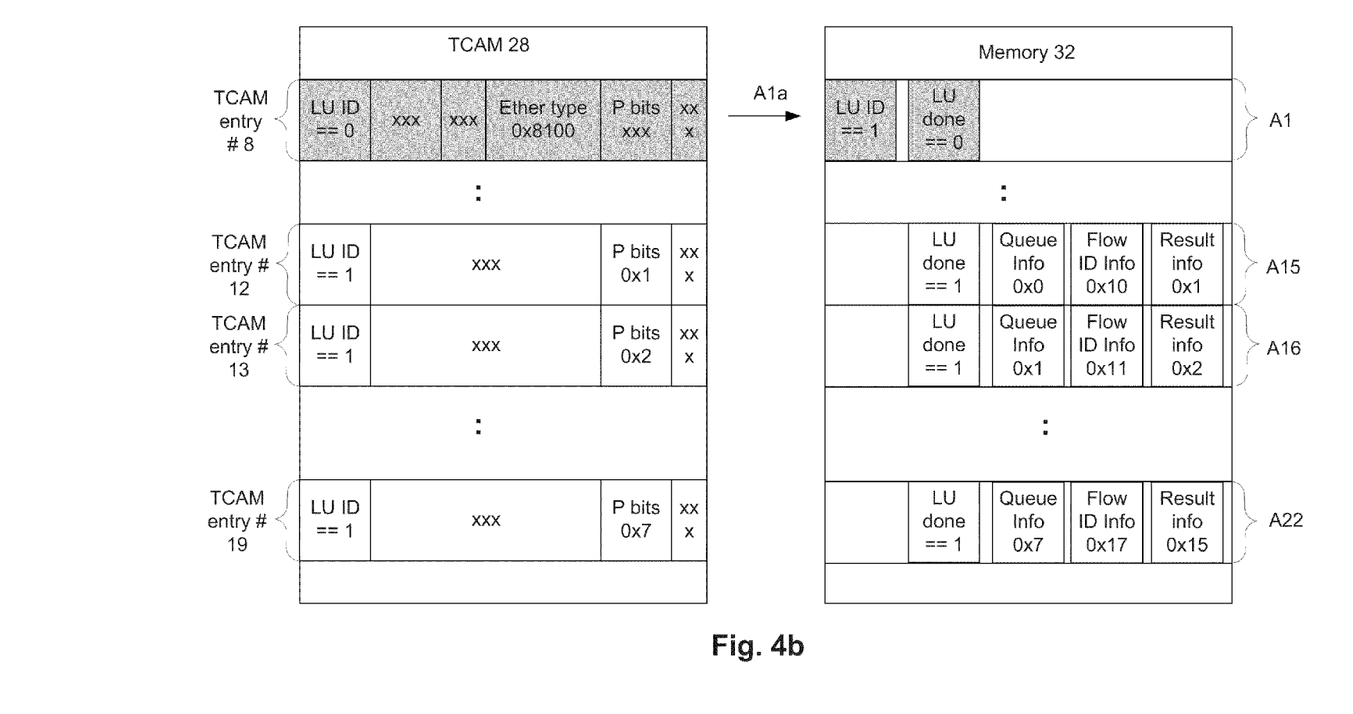
FIG. 4b schematically illustrates the first parsing and classification cycle, in accordance with an embodiment of the present disclosure.

FIG. 4b schematically illustrates the first parsing and classification cycle, in accordance with an embodiment of the present disclosure. In the first parsing and classification cycle of FIG. 4b, the input 400a of FIG. 4a is used as an input to the TCAM 28.

FIG. 4b illustrates the TCAM 28, which includes several example entries. For example, TCAM entry number 8 includes LU ID of 0, Ethernet type of 0×8100, and several other fields (e.g., priority bits field) illustrated as xxx. Another example TCAM entry number 12 includes LU ID of 1, and several other fields (e.g., priority bits field) illustrated as xxx. Several other example TCAM entries are also illustrated in FIG. 4b. Although several TCAM fields in FIG. 4b are illustrated to include xxx, these fields actually include 0's or 1's, but are not illustrated in FIG. 4b for purposes of illustrative clarity and to not obfuscate the teachings of the present disclosure. In an embodiment, at least some of the xxx fields are Don't care bits for the TCAM 28. During the first parsing and classification cycle, the LU ID 146a masks a part of the database of the TCAM 28 in which a LU ID field has a value of one, and a TCAM search during the first parsing and classification cycle is performed only in those part of TCAM 28 which are not masked by the LU ID 146.

FIG. 4b also illustrates the memory 32, which includes several example entries. For example, an example entry corresponding to memory address A1 includes LU ID of 1, and LU done of 0. In an embodiment, although address A1 includes several other fields, these fields are not illustrated for purposes of illustrative clarity. Another example entry corresponding to an example memory address A15 includes LU done of 1, queue info (e.g., queue info 320a of FIG. 3) of 0×0, result info (e.g., result info 324a of FIG. 2) of 0×1, and flow ID info (e.g., flow ID info 328a of FIG. 2) of 0×10. Several other example memory entries, corresponding to example memory addresses A16 and A22, are also illustrated in FIG. 4b.

Referring again to FIGS. 4a and 4b, during the first parsing and classification cycle, the input 400a matches with TCAM entry 8. In FIG. 4b, TCAM entry 8 is illustrated in grey shades to illustrate the matching with the input 400a. Accordingly, the input 400a is a TCAM hit, and the TCAM 28 outputs information associated with the TCAM entry 8. For example, the TCAM 28 outputs address A1a associated with the TCAM entry 8.

In an embodiment, the address A1a is an address of the memory 32. For example, address A1a matches with address A1 of the memory 32. Thus, based on receiving the address A1a, during the first parsing and classification cycle the memory 32 outputs contents stored at the address A1. The contents of the memory 32, stored at address A1, is illustrated in grey shade in FIG. 4b to illustrate that the memory 32 outputs the contents of this address. For example, the memory 32 outputs values 1 and 0 corresponding to LU ID 146a and LU done 146b, respectively. A value 0 corresponding to LU done 146b indicates that the first parsing and classification cycle is not the final first parsing and classification cycle for the data packet DP1, and at least another parsing and classification cycle is necessary for parsing and/or classifying the data packet DP1. A value 1 corresponding to LU ID 146a represents a look-up identification for the second parsing and classification cycle.

Figure 5A:
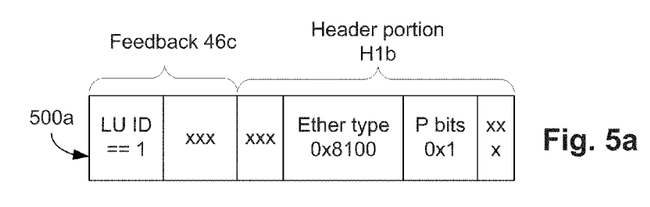
FIG. 5a schematically illustrates an example input to the ternary content-addressable memory of the iterative parser and classifier engine of FIGS. 1-3, during a second parsing and classification cycle, in accordance with an embodiment of the present disclosure.

FIG. 5a schematically illustrates an example input 500a to the TCAM 28 during the second parsing and classification cycle, in accordance with an embodiment of the present disclosure. The header portion H1b forms a part of the input 500a, while the feedback 46c from the first parsing and classification cycle forms another part of the input 500a.

As previously discussed, during the first parsing and classification cycle, the memory 32 output a LU ID 146a of 1, as illustrated in FIG. 4b. Accordingly, the LU ID in the input 500a is 1. The header portion H1b in FIG. 5a is illustrated to be similar to the header portion H1a in FIG. 4a. However, in other embodiments, the header portion H1b can be different from the header portion H1a in FIG. 4a, based at least in part on the feedback 46b that is output by the memory 32 and/or the feedback processing unit 36 during the first parsing and classification cycle.

Figure 5B:
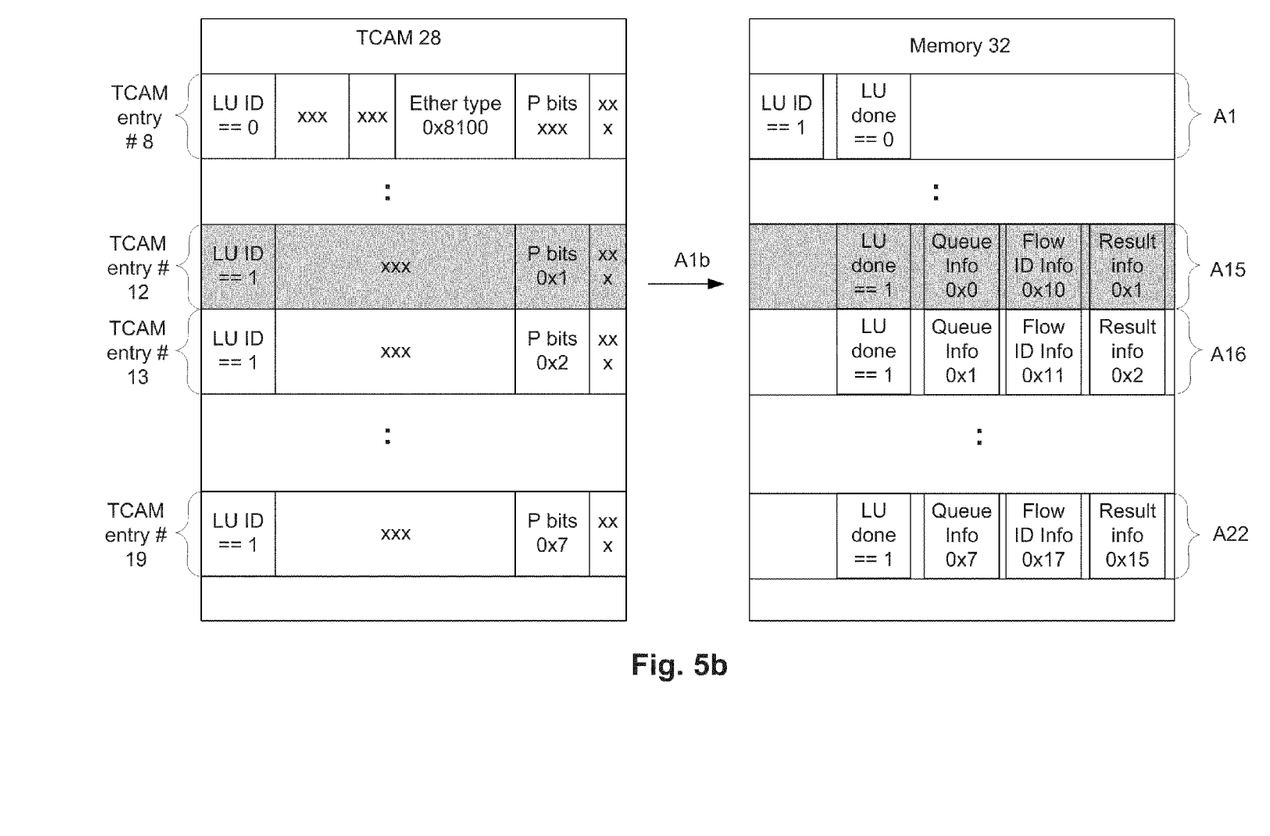
FIG. 5b schematically illustrates the second parsing and classification cycle, in accordance with an embodiment of the present disclosure.

FIG. 5b schematically illustrates the second parsing and classification cycle, in accordance with an embodiment of the present disclosure. In the second parsing and classification cycle of FIG. 5b, the input 500a of FIG. 5a is used as an input to the TCAM 28. The entries of the TCAM 28 and the memory 32 in FIGS. 4b and 5b are similar. For example, similar to FIG. 4b, FIG. 5b illustrates example entries 8, 12, 13 and 19 for the TCAM 28, and example entries corresponding to addresses A1a, A15, A16 and A22 in the memory 32.

Referring again to FIGS. 5a and 5b, during the second parsing and classification cycle, the input 500a matches with TCAM entry 12. In FIG. 5b, TCAM entry 12 is illustrated in grey shades to illustrate the matching with the input 500a. Accordingly, the input 500a is a TCAM hit, and the TCAM 28 outputs information associated with the TCAM entry 12 during the second parsing and classification cycle. For example, the TCAM 28 outputs address A1b associated with the TCAM entry 12.

In an embodiment, the address A1b is an address of the memory 32. For example, in FIG. 5b, the address A1b matches with address A15 of the memory 32. Thus, based on receiving the address A1b, during the second parsing and classification cycle the memory 32 outputs contents stored at the address A15. The contents of the memory 32, stored at address A15, is illustrated in grey shade in FIG. 5b to illustrate that the memory 32 outputs the contents of this address. For example, the memory 32 outputs values 1, 0×0, 0×1, and 0×10 corresponding to LU done 146b, queue info queue info (e.g., queue info 320a of FIG. 3), result info (e.g., result info 324a of FIG. 2), and flow ID info (e.g., flow ID info 328a of FIG. 2), respectively.

A value 1 corresponding to LU done 146b indicates that the second parsing and classification cycle is the final first parsing and classification cycle for the data packet DP1, and any additional further parsing and classification cycle is not necessary for parsing and/or classifying the data packet DP1. Accordingly, during the second classification cycle, the classification processing unit 40 outputs classification 44b, based in part on the queue info, result info, and flow ID info received from the memory 32.

Although FIGS. 4a, 4b, 5a and 5b illustrate parsing and classifying the data packet DP1 using only two parsing and classifying cycles, in an embodiment, a greater number (e.g., three, eight or more) of parsing and classifying cycles may be used for parsing and classifying the data packet DP1.

In an embodiment, the actual entries in the TCAM 28 are similar for individual cycles of the various iterative parsing and classification cycles (e.g., for the first and second parsing and classification cycles). However, the feedback 46c is used to mask some of the lines in the TCAM 28 in a current parsing and classification cycle, so that the effective portion of the TCAM 28, used in a current parsing and classification cycle, is limited and based on knowledge gained from the previous parsing and classification cycle. As a simple example, as the LU ID 146a is one in the second parsing and classification cycle, a large portion of the TCAM entries (e.g., entries with LU ID field of zero) are masked (i.e., not searched) during second parsing and classification cycle. Thus, the feedback 46c effectively reduces an area in the TCAM 28 that is to be searched in a current cycle, based on feedback 46c received from the previous cycle. Accordingly, the effective searchable area in the TCAM 28 changes from one parsing and classification cycle to another. For example, the TCAM 28 can be a large table, including a large number of entries. However, during each parsing and classification cycle, the feedback 46c masks a large number of the TCAM entries (i.e., these entries are not searched), as previously discussed. Only a portion of the TCAM entries, which are not masked by the feedback 46c, are searched against the output of the packet header offset unit 24 (i.e., searched against the header portion H1a, H1b, etc.).

Accordingly, during each parsing and classification cycle, the feedback 46b refines a search key (that is to be searched in the TCAM 28) by facilitating selection of header portions H1a, H1b, etc. On the other hand, during each parsing and classification cycle, feedback 46c refines a database of the TCAM 28, by masking portion of the TCAM entries and allowing the search to be performed in a reduced and effective database of the TCAM.

In various embodiments and although not illustrated in any of the figures, the actual TCAM entries are also changed between various parsing and classification cycles.

In an embodiment, contents of the TCAM 28 and/or memory 32 are dynamically and/or periodically updated based at least in part on, for example, an application area of the SOC 14, type of data packets handled by the IPAC 20, and/or the like. Such updating of the contents of the TCAM 28 and/or memory 32 ensures that the IPAC 20 parses and classifies several types of data packets, without any substantive modification in the hardware configuration of the IPAC 20.

Iteratively parsing and classifying data packets, as disclosed in the present disclosure, have several advantages. For example, during individual parsing and classifying cycles, corresponding fields of the header portion of a data packet are matched with various fields in the TCAM 28. Also, during individual parsing and classification cycles, individual logical areas of the TCAM 28 can be looked up. In an embodiment, due to iterative parsing and classification operations, the size of the TCAM 28 is smaller compared to a TCAM used in a conventional parsing and classifying engines. In an embodiment, due to iterative parsing and classification operations (e.g., due to use of a relatively smaller sized TCAM), the parsing and classification operations disclosed in the present disclosure is relatively faster than conventional parsing and classification operations. Further, the IPAC 20 is fully programmable, and can be configured so that desired classification data is output by the IPAC 20 (e.g., by programming the TCAM 28 and/or memory 32 accordingly). Furthermore, the IPAC 20 provides flexible partitioning between parsing operation and classification operation of the IPAC 20 (e.g., by programming the TCAM 28 and/or memory 32 accordingly). Also, the IPAC 20 uses minimal or no resource of the processing core(s) of the SOC 14, thereby leaving the processing core(s) for other operations of the SOC 14.

Figure 6:
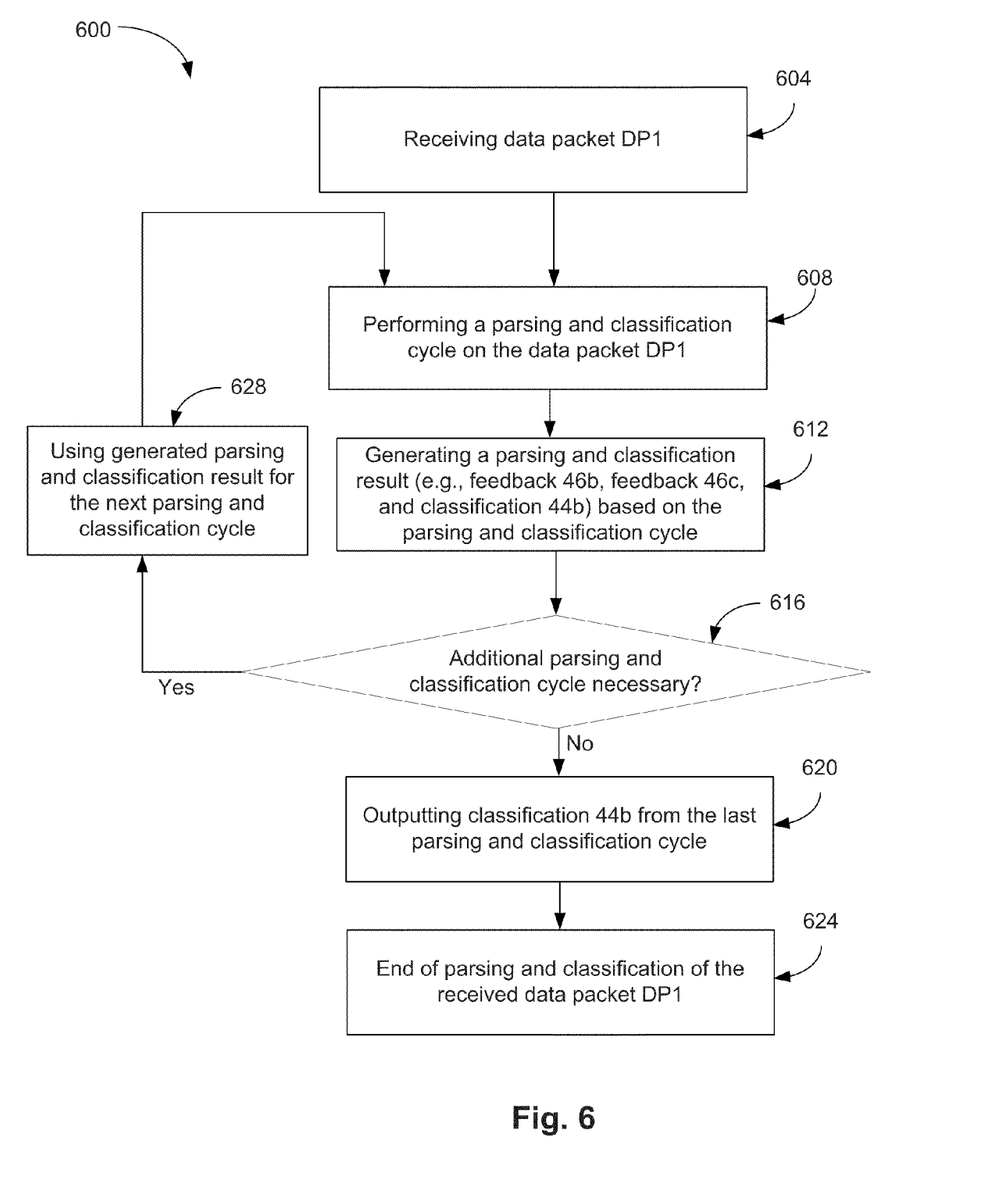
FIG. 6 illustrates an example method for operating the iterative parser and classifier engine of FIGS. 1-3, in accordance with an embodiment of the present disclosure.

FIG. 6 illustrates an example method 600 for operating the IPAC 20 of FIGS. 1-3, in accordance with an embodiment of the present disclosure. The method 600 includes, at 604, receiving (e.g., by the packet header offset unit 24 from the network controller 12) a data packet DP1.

At 608, the IPAC 20 performs a parsing and classification cycle (e.g., a first parsing and classification cycle) on the data packet DP1. For example, the packet header offset unit 24 generates a first header portion H1a of the data packet during the first parsing and classification cycle, based on which the IPAC 20 performs a first look-up at the TCAM 28. In an embodiment, the first look-up is also based on an origin port address of the data packet (e.g., port ID 216). A first address A1a is generated based at least in part on performing the first look-up.

At 612, the IPAC 20 generates a parsing and classification result (e.g., a first parsing and classification result that includes feedback 46b, feedback 46c, and classification 44b) based on the parsing and classification cycle (e.g., based on accessing first content, which includes feedback 46a and classification 44a, from the first address A1a of the memory 32).

At 616, the IPAC 20 determines whether any additional parsing and classification cycle is necessary. The first parsing and classification result includes a parsing and classification complete flag (i.e., the LU done 146b). For example, if the parsing and classification complete flag is low, it is determined, at 616, that an additional parsing and classification cycle is necessary. On the other hand, at 616, if the parsing and classification complete flag is high, it is determined that no additional parsing and classification cycle is necessary.

If no additional parsing and classification cycle is necessary to parse and classify the data packet, at 620, classification 44b is output from the first parsing and classification cycle by the classification unit 40. After outputting the classification 44b, at 624, the parsing and classification of the received data packet DP1 ends.

If an additional parsing and classification cycle is necessary, at 628, the first parsing and classification result (generated at 612) is used for the next (e.g., second) parsing and classification cycle. Operations of blocks 608, 612, 616 and 628 are repeated until it is determined, at 620, that no additional parsing and classification cycle is necessary.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
performing, by an iterative parser and classifier engine, a first parsing and classification cycle on a data packet, based at least in part on header information of the data packet;
generating a first parsing and classification result based at least in part on performing the first parsing and classification cycle;
performing a second parsing and classification cycle on the data packet, based at least in part on header information of the data packet and the first parsing and classification result;
based at least in part on performing the second parsing and classification cycle, generating a second parsing and classification result such that the second parsing and classification result includes a parsing and classification complete flag indicating whether an additional parsing and classification cycle is needed to parse and classify the data packet;
if the parsing and classification complete flag indicates an additional parsing and classification cycle is needed to parse and classify the data packet, performing a third parsing and classification cycle on the data packet, based at least in part on header information of the data packet and the second parsing and classification result; and
if the parsing and classification complete flag indicates no additional parsing and classification cycle is needed to parse and classify the data packet, outputting a classification result for the data packet.

2. The method of claim 1, wherein said performing the first parsing and classification cycle further comprises:
performing, based at least in part on a header portion of the data packet, a first look-up at a content-addressable memory (CAM);
generating a first memory address based at least in part on said performing the first look-up; and
accessing a first content from the first memory address of a memory, the first content including the first parsing and classification result.

3. The method of claim 1, wherein said outputting the classification result further comprises:
outputting the classification result based at least in part on classification information included in the second parsing and classification result.

4. The method of claim 1, wherein said outputting the classification result further comprises:
outputting the classification result that comprises information associated with one or more of a queue, a priority, and a flow identification associated with the data packet.

5. The method of claim 1,
wherein performing the first parsing and classification cycle further comprises performing the first parsing and classification cycle based at least in part on a first header portion of a header of the data packet;
wherein performing the second parsing and classification cycle further comprises performing the second parsing and classification cycle based at least in part on a second header portion of the header of the data packet, wherein the second header portion is different from the first header portion.

6. The method of claim 1, wherein performing the second parsing and classification cycle further comprises:
performing the second parsing and classification cycle based at least in part on a header offset information that is included in the first parsing and classification result.

7. A system-on-chip (SOC) comprising:
a processing core; and
an iterative parser and classifier engine (IPAC) comprising:
a packet header offset unit configured to receive a data packet and to generate, (i) during a first iterative cycle, a first header portion from a header of the data packet, and (ii) during a second iterative cycle, a second header portion,
a ternary content-addressable memory (TCAM), wherein the IPAC is configured to perform, during the first iterative cycle, a first look-up at the TCAM using the first header portion, and to generate a first memory address in response to the first look-up,
a memory, wherein the IPAC is configured to access, (i) during the first iterative cycle, a first content from the first memory address in the memory, and (ii) during the second iterative cycle, a second content from a second memory address in the memory, and
a feedback processing unit configured to (i) receive the first content from the memory and generate a first feedback and (ii) receive the second content from the memory and generate a second feedback, wherein the second feedback includes a parsing and classification complete flag indicating whether an additional iterative cycle is needed to parse and classify the data packet.

8. The SOC of claim 7, wherein the packet header offset unit is further configured to generate, during the second iterative cycle, the second header portion from the header of the data packet, based at least in part on the first feedback.

9. The SOC of claim 7, wherein the IPAC is further configured to:
generate an effective portion of the TCAM by masking a plurality of entries of the TCAM, based at least in part on the first content; and
perform the second iterative cycle by performing a second look-up at the effective portion of the TCAM using the second header portion that is generated based on the first content.

10. The SOC of claim 8, wherein the IPAC is further configured to:
perform, during the second iterative cycle, a second look-up at the TCAM using the second header portion and the first feedback; and
generate the second memory address in response to the second look-up.

11. The SOC of claim 10, wherein:
the IPAC further includes a classification unit for generating classification information of the data packet;
if the parsing and classification complete flag indicates an additional parsing and classification cycle to parse and classify the data packet, the IPAC is further configured to perform a third parsing and classification cycle on the data packet, based at least in part on a third header portion of the data packet and the second feedback; and
if the parsing and classification complete flag indicates no additional parsing and classification cycle to parse and classify the data packet, the classification unit is configured to output a classification result for the data packet based at least in part on the second content.

12. The SOC of claim 7, wherein the memory is a static random access memory (SRAM).

13. The SOC of claim 7, wherein the packet header offset unit is configured to receive the data packet from a network controller.

14. A method comprising:

receiving a data packet;

performing, using a first header portion of a header of the data packet, a first look-up at a ternary content-addressable memory (TCAM) to generate a first content based on an output of the TCAM;

performing, using a second header portion of the header of the data packet and the first content, a second look-up at the TCAM to generate a second address;

accessing a second content from the second address of the memory, the second content including a parsing and classification complete flag indicating whether an additional look-up is needed to parse and classify the data packet;

if the parsing and classification complete flag indicates an additional parsing and classification cycle to parse and classify the data packet, performing, using a third header portion of the header of the data packet and the second content, a third look-up at the TCAM to generate a third address, wherein the third header portion is generated from the header based at least in part on the second content; and if the parsing and classification complete flag indicates no additional parsing and classification cycle to parse and classify the data packet, outputting a classification result for the data packet based at least in part on the second content.

15. The method of claim 14, wherein said performing the first look-up further comprises:

performing the first look-up to generate a first memory address: and generating the first content by accessing the first memory address of a memory.

16. The method of claim 14, wherein:

the second header portion is based at least in part on the first content; and the second header portion is different from the first header portion.

* * * * *